(12) United States Patent
Choi et al.

(10) Patent No.: US 7,272,837 B2
(45) Date of Patent: Sep. 18, 2007

(54) DISK TRAY FOR DISK DRIVE ADOPTING RESONATOR AND DISK DRIVE HAVING THE SAME

(75) Inventors: Myung-ryul Choi, Seoul (KR); Soon-kyo Hong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 169 days.

(21) Appl. No.: 10/612,040

(22) Filed: Jul. 3, 2003

(65) Prior Publication Data
US 2004/0205788 A1    Oct. 14, 2004

(30) Foreign Application Priority Data
Jul. 4, 2002    (KR) ............... 2002-38664

(51) Int. Cl.
*G11B 33/02* (2006.01)
(52) U.S. Cl. .................................................. 720/611
(58) Field of Classification Search ............... 720/611, 720/698, 65.1; 369/263, 263.1; 360/97.01, 360/97.02; 310/51
See application file for complete search history.

(56) References Cited

U.S. PATENT DOCUMENTS 6,005,749 A * 12/1999 Ikuta et al. ............... 360/99.12
6,172,842 B1 * 1/2001 Satoh et al. .............. 360/97.01
6,683,840 B2 * 1/2004 Shin ........................... 720/698
6,690,540 B2 * 2/2004 Hirasaka et al. ......... 360/97.02
6,785,217 B1 * 8/2004 Kao et al. ................ 369/263.1
6,859,933 B2 * 2/2005 Park et al. .................. 720/651
2002/0085478 A1 * 7/2002 Park et al. ................... 369/263

FOREIGN PATENT DOCUMENTS

| EP | 1207532 A2 * | 5/2002 |
|---|---|---|
| JP | 08203259 A * | 8/1996 |
| JP | 2002-163885 | 6/2002 |
| KR | 1999-80545 | 11/1999 |
| KR | 2000-75152 | 12/2000 |
| KR | 2001-16753 | 3/2001 |
| KR | 2001-68770 | 7/2001 |

* cited by examiner

*Primary Examiner*—Tianjie Chen
(74) *Attorney, Agent, or Firm*—Staas & Halsey LLP

(57) ABSTRACT

A disk tray for a disk drive that slides in and out of the disk drive, one or more resonators mounted on a lower surface of the disk tray to selectively reduce noise of a predetermined frequency band. According to the present invention, the dominant resonance noise frequency band, which occurs at the peak sound pressure level, is reduced or removed from the noise generated in the disk drive. Also, by filling a resonance container of the resonator with a porous member, the high frequency noise band and the overall noise level can be reduced.

8 Claims, 4 Drawing Sheets

DISK TRAY FOR DISK DRIVE ADOPTING RESONATOR AND DISK DRIVE HAVING THE SAME

CROSS-REFERENCE TO RELATED APPLICATIONS

This application claims the benefit of Korean Patent Application No. 2002-38664, filed Jul. 4, 2002, in the Korean Intellectual Property Office, the disclosure of which is incorporated herein in its entirety by reference.

BACKGROUND OF THE INVENTION

1. Field of the Invention

The present invention relates to a disk drive, and, more particularly, to a disk tray with a resonator to reduce noise and vibration, such as noise generated during rotation of a disk.

2. Description of the Related Art

FIG. 1 is a perspective view of a conventional disk drive. In general, disk drives are apparatuses for either recording information on a recording surface of a disk having concentric tracks, or reading information from the recording surface. Referring to FIG. 1, the disk drive records data on the recording surface of a disk 60 rotating with a linear velocity, or reads data from the recording surface of the disk 60, by using a data recording/reproducing unit, such as optical pickup device 40, that slides in a radial direction with respect to the disk 60.

The conventional disk drive typically includes a disk tray 10 on which a disk is mounted and loaded, a disk driving portion 20 to rotate the disk 60, a disk chucking apparatus 30 with a chuck plate 31 and a disk chuck 32, and an optical pickup device driving portion 50. The disk tray 10 has a window 11 penetrating the disk tray 10 to facilitate operation of the disk chucking apparatus 30 and the optical pickup device 40.

To accurately record or read data on or from the recording surface of the disk 60, the light beam emitted from the optical pickup device 40 must be accurately incident on a track of the recording surface of the disk 60, and a predetermined angle is always maintained between the recording surface and the optical axis of the light beam emitted from the optical pickup device 40. However, vibration is generated due to the rotating disk 60 that deteriorates the recording and reproduction feature of the disk drive. Further, as the rotation speed of the disk drive increases, the vibration generated during the rotation of the disk 60 impacts reliability in recording and reproduction of data. Also, noise generated during the rotation of the disk 60 is unpleasant to users. Accordingly, reducing or removing the noise and vibration is very important.

The noise and vibration generated during the rotation of the disk 60 result from friction between a surface of the disk 60 and surrounding air, a difference in pressure around the disk 60, collision of air with the rotating disk 60 and the disk tray 10 and an inner surface of the disk drive, and turbulence formed around the disk 60.

The conventional technologies to reduce noise and vibration in disk drives are described below.

Korean Patent Publication No. 2000-75152 discloses technologies to reduce noise and vibration by filling gaps, which contribute to the generation of noise, between constituent elements in a disk drive with a sound shield or a sound absorbing member so that the noise is not discharged to the outside, or by forming grooves at predetermined intervals in a portion of a chucking plate of a disk chucking apparatus corresponding to the outer circumferential surface of a disk (i.e., at the outer circumference of the chucking plate), using the muffler effect technology of the automobile industry.

Also, Korean Patent Publication No. 2001-16753 discloses a technology to reduce noise and vibration that uses an auto-balancing method of inserting balls in a plurality of races provided in a turntable of a disk and moving the balls in a radial direction by the centrifugal force generated during rotation of the turntable to compensate for eccentricity of the turntable.

Also, Korean Patent Publication No. 1999-80545 discloses a noise reduction apparatus to reduce, during rotation of the disk, air resistance due to the shape of the profile of a disk, air friction on the upper and lower surfaces of the disk, collision of air with a wall surface due to a separation phenomenon at an outer edge of the disk, and noise due to the flow of turbulence at a high speed. In the noise reduction apparatus, a plurality of blades are installed on the upper surface of the disk tray that are separated a predetermined distance, or a groove or dimple having a screw or vortex shape is formed thereon. Thus, the speed gradient at a boundary surface on the upper and lower surface of the disk is removed and collision of the high speed air flow at the leading end of the disk is prevented so that noise and vibration due to the flow of the high speed turbulence are reduced.

However, the conventional technologies focus only on the reduction of a level of the overall noise. Thus, a highly effective noise reduction effect can be obtained by not only reducing the level of the overall noise, but also by reducing or removing the most dominant noise frequency of the disk drive.

SUMMARY OF THE INVENTION

It is an aspect of the present invention to provide a disk drive having a structure that reduces or removes the dominant noise frequency band which occurs at the peak sound pressure level, from the noise in the disk drive, and also to reduce the overall level of noise.

Additional aspects and/or advantages of the invention will be set forth in part in the description that follows and, in part, will be obvious from the description, or may be learned by practice of the invention.

To achieve the above and/or other aspects according to the present invention, there is provided a disk tray for a disk drive that slides in and out of the disk drive, the disk tray including one or more resonators mounted on a lower surface of the disk tray to selectively reduce noise of a predetermined frequency band.

To achieve the above and/or other aspects according to the present invention, there is provided a disk drive including a disk tray that slides in and out of the disk drive and on which a disk is placed, a disk driving portion rotating the disk at a predetermined speed, a disk chucking apparatus holding the disk on the disk driving portion, a data recording/reproducing unit recording data on the disk or reproducing data from the disk, and one or more resonators installed on a lower surface of the disk tray to selectively reduce noise of a predetermined frequency band.

Each resonator includes a through hole penetrating the disk tray and operating as an entrance and a bottle neck of each resonator; and a resonance container surrounding the through hole and having a predetermined volume, the predetermined frequency band being determined according to an area of a profile of the through hole, a length of the bottle neck of the through hole, and a volume of the resonance container.

A bottom surface of the resonance container is open.

The resonator further includes an absorbing member filling the resonance container.

To achieve the above and/or other aspects according to the present invention, there is provided a resonator for a disk tray of a disk drive, including a through hole penetrating the disk tray and operating as an entrance and a bottle neck of the resonator; and a resonance container surrounding the through hole and having a predetermined volume, the resonator being mounted on the disk tray to selectively reduce noise of a predetermined frequency band, the predetermined frequency band being determined according to an area of a profile of the through hole, a length of the bottle neck of the through hole, and the volume of the resonance container.

These, together with other aspects and/or advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the present invention will become apparent and more readily appreciated from the following description of the embodiments, taken in conjunction with the accompany drawings, of which.

DETAILED DESCRIPTION OF THE INVENTION

Figure 1:
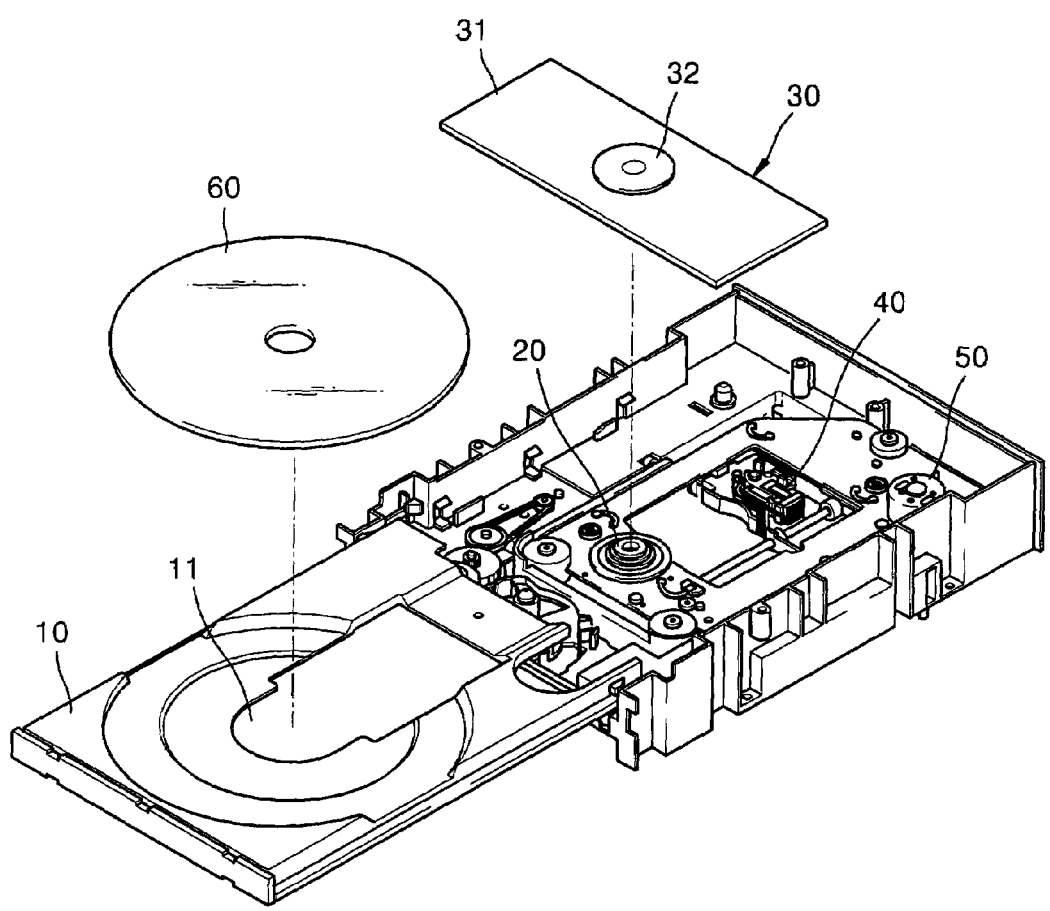
FIG. 1 is a perspective view illustrating a conventional disk drive.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

Figure 2:
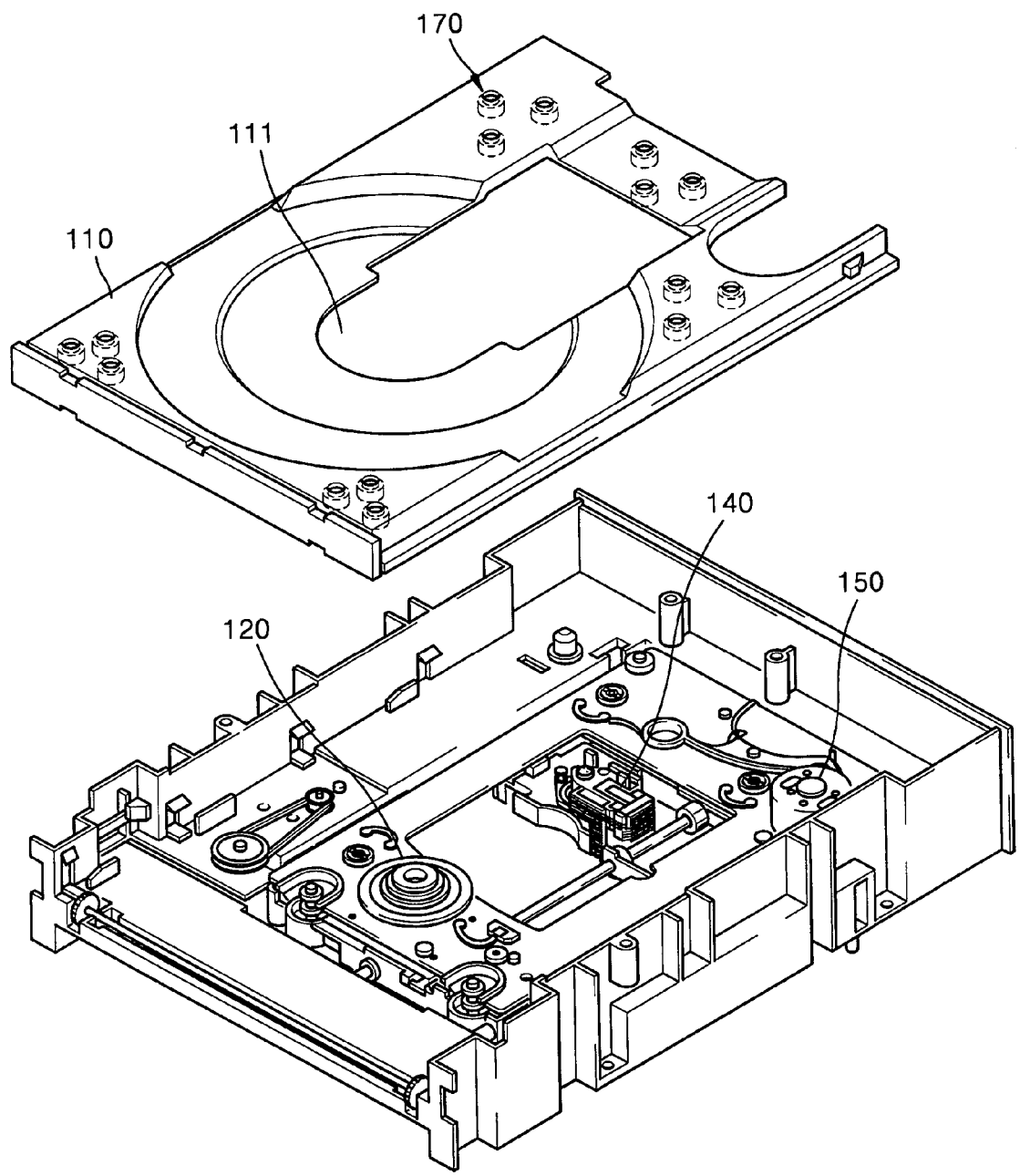
FIG. 2 is a perspective view illustrating a disk tray for a disk drive with a resonator according to an embodiment of the present invention and a disk drive having the disk tray.

Referring to FIG. 2, a disk drive according to the present invention includes a disk tray 110, a disk driving portion 120, a disk chucking apparatus (not shown), a data recording/reproducing unit such as an optical pickup device 140, and an optical pickup device driving portion 150.

The disk tray 110 slides in and out of the front of the disk drive and a disk (not shown) is placed thereon to be loaded or unloaded. The disk driving portion 120 includes a turntable (not shown) on which the disk is placed and a spindle motor (not shown) installed under the turntable to rotate the turntable, which rotates the disk at a predetermined speed. The disk chucking apparatus 130 includes a magnetic member (not shown) attracted to a magnet (not shown) located at the center of the turntable to fix the disk to a rotation shaft (not shown). The data recording/reproducing unit records data on a recording surface of the disk or reproduces data from the recording surface of the disk. In particular, in an optical disk drive, the data recording/reproducing unit can be realized by the optical pickup device 140. The optical pickup device 140 includes a laser diode not shown as a light source, a collimating lens (not shown) for making a light beam emitted from the laser diode a parallel beam, a polarization prism (not shown), a mirror (not shown), and an objective lens (not shown). The optical pickup device 140 emits a laser beam while sliding in a radial direction with respect to the disk, which is rotating to record data on a recording surface of the disk or read data from the recording surface of the disk. Also, the optical pickup device driving portion 150 includes a motor and gear or belt (not shown) that make the optical pickup device 140 slide in the radial direction.

The disk drive according to the present invention includes at least one resonator 170, which selectively reduces noise of a particular noise frequency band.

During the rotation of the disk, noise is generated due to friction between the surface of the rotating disk and surrounding air, a difference in pressure around the disk, collision of air generated between the rotating disk and the disk tray 110 and the inner surface of the disk drive, a vortex generated in a window 111 of the disk tray 110, and turbulence generated around the rotating disk. That is, the constituent elements of the disk drive, such as the disk tray 110, the disk driving portion 120, and the optical pickup device 140, become sources of noise. As a result, the level of sound pressure of noise and the noise frequency are determined by the internal structure of the disk drive and the arrangement of the constituent elements. Also, a dominant noise frequency band forming the peak sound pressure level is present in noise generated during the rotation of the disk according to a particular internal structure of the disk drive.

Figure 3:
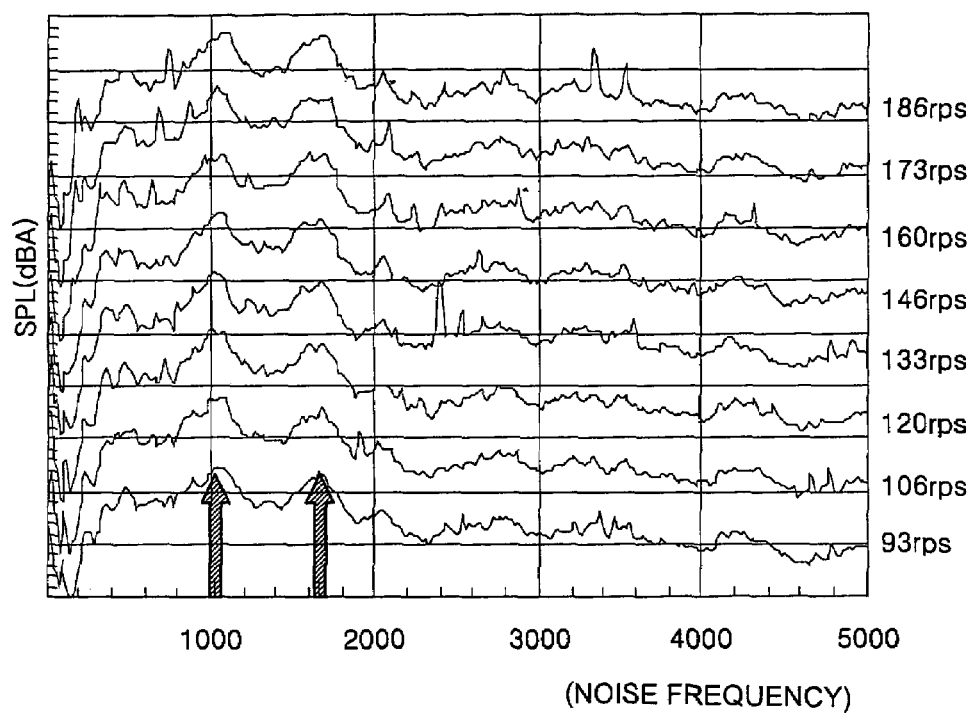
FIG. 3 is a graph showing the distribution of sound pressure level (SPL) with respect to the noise frequency generated during rotation of a disk in the disk drive of FIG. 2, in which a rotation speed of the disk in revolutions per second (rps) is used as a parameter.

FIG. 3 shows an example of a graph of the distribution of sound pressure level (SPL) with respect to the noise frequency generated during rotation of the disk in the disk drive according to the present invention, in which the rotation speed of the disk in revolutions per second (rps) is used as a parameter. In FIG. 3, the difference in the level of sound pressure according to the disk rotation speed (rps) is arbitrarily indicated to prevent overlap of graphs. Accordingly, in FIG. 3, a comparison of the level of sound pressure between the various disk rotation speeds is not useful. However, the magnitude of the noise frequency where the peak sound pressure level appears in the data with respect to a particular disk rotation speed is important, and the present invention reduces the sound pressure level corresponding to the dominant noise frequency band.

Referring to FIG. 3, it can be seen that the noise frequency indicated by the peak sound pressure level appears around 1000 Hz and 1700 Hz, regardless of the disk rotation speed. Thus, the noise can be reduced by installing a resonator to absorb or reduce the noise frequency band where the peak sound pressure level occurs.

The conventional technologies for the reduction of noise in a disk drive reduce the overall level of noise generated in the disk drive. However, the present invention focuses on searching for the noise frequency band where the peak sound pressure level generated in the disk drive occurs and selectively reducing noise in the noise frequency band.

Figure 4:
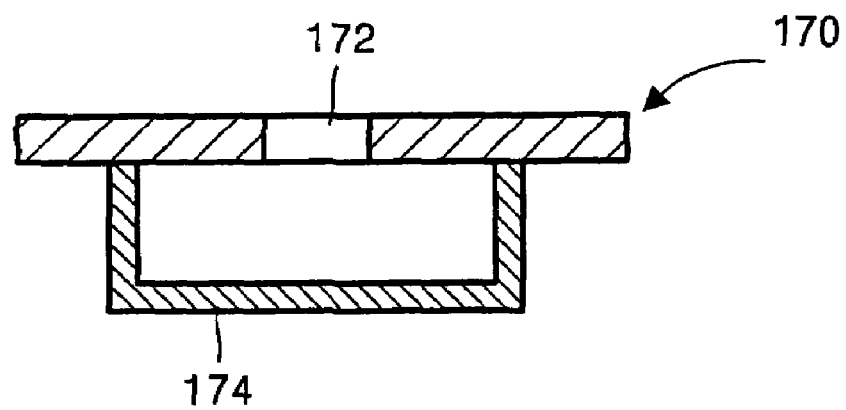
FIG. 4 is a view illustrating a resonator to reduce noise in the disk drive of FIG. 2.

FIG. 4 illustrates a resonator 170 having a circular profile, for example, to reduce noise in a disk drive according to one embodiment of the present invention. The resonator 170 of the present invention selectively reduces or removes noise within a particular noise frequency band and is described below.

In a box having an arbitrary geometrical shape and a certain volume, a resonance phenomenon occurs as the sound pressure level is amplified at a particular noise frequency, that is, at a resonance frequency. The arbitrary geometrical shape generating a resonance phenomenon is referred to as a resonator.

For example, the tone of the sound generated when blowing into a bottle filled with water, differs from the tone of the sound generated when blowing into an empty bottle. The tone is determined by the amount of air space and the size of the bottle neck. That is, because the air space of the bottle decreases with the addition of water, the resonance frequency increases, which increases the tone.

A noise absorber referred to as a Helmholtz resonator uses the principle described above. The Helmholtz resonator includes a container having a specific volume with a bottle neck shorter than the resonating wave length.

When a sound wave is input to the resonator, air in the bottle neck becomes compressed and oscillates. However, the sound wave does not enter the closed space in the bottle, but is pushed back out of the bottle through the bottle neck. The frequency oscillated by a repulsive force in the closed space and bottle neck due to the input sound pressure level has the same frequency as that of the input sound wave at the entrance of the bottle neck, but has a reverse phase generating canceling interference. Thus, sound energy is converted to thermal energy to reduce the sound pressure level of the resonance frequency and provide a frequency selective absorption feature. In other words, air in the bottle neck begins to resonate such that interference occurs, causing frequency cancellation for a specific frequency.

As shown in FIG. 4, the air of a through hole 172, which is analogous to a bottle neck, of the resonator 170 functions as mass, while the volume of a resonance container 174 functions as a spring. Thus, as the natural frequency of a mechanical system is determined by a mass and a spring, the resonance frequency of the resonator 170 is determined by the volume of the through hole 172, which is a bottle neck, and the volume of the resonance container 174. That is, the resonance frequency of the resonator 170 is determined by the following equation.

$$f = \frac{c}{2\pi} \sqrt{\frac{A}{l \cdot V}}$$

In the equation, f is the resonance frequency, c is the velocity of sound, A is the area of the entrance of the resonator, l is the length of the through hole that is a bottle neck of the resonator, and V is the volume of the resonance container.

The resonance noise frequency of the resonator 170 corresponding to the natural frequency is determined by A, l, and V. Here, the specific shape of the resonator 170 does not affect the resonance frequency. Thus, if the profile of the resonator 170 is not circular, but if the area A of the entrance of the resonator 170, the length l of the bottle neck, and the volume V of the resonance container 174 are the same, an identical resonance noise frequency can be obtained. That is, the entrance of the resonator 170, the bottle neck portion, and the profile of the resonance container 174 do not need to be circular.

In general, the Helmholtz resonator has a superior effect on reduction of noise in the middle or low frequency band, rather than in a high frequency band. However, when filled with a noise absorbing member such as a porous member, the Helmholtz resonator reduces a high frequency band. Thus, by filling the resonance container 174 with a porous member, for example, a sponge, the Helmholtz resonator can absorb a range of frequencies above f, where f is the frequency absorbed without the sponge, as indicated by the equation above. For example, referring to FIG. 3, a resonator without the sponge will reduce the SPL within a relatively low frequency band, whereas a resonator with the sponge will reduce the SPL within a higher frequency band.

Figure 5:
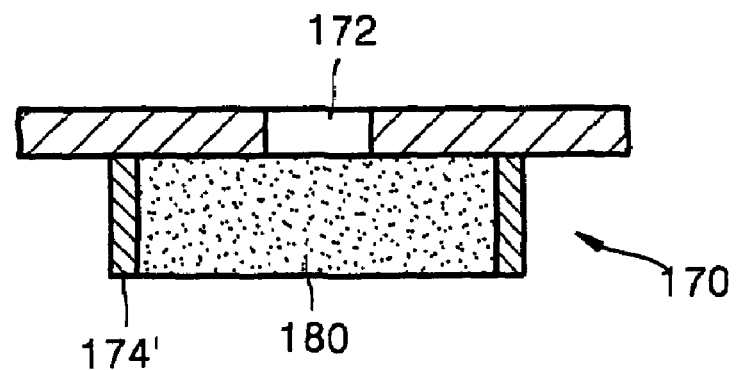
FIG. 5 is a view illustrating a resonator to reduce noise in the disk drive of FIG. 2 according to another embodiment of the present invention.

FIG. 5 illustrates another embodiment of the resonator used to reduce noise in a disk drive according to the present invention. Referring to FIG. 5, the bottom surface of the resonance container 174' is open, and a porous member 180 fills the resonance container 174' through the bottom surface thereof. The porous member 180 functions as the bottom surface of the resonance container 174', while noise in a relatively large frequency band is reduced.

As described above, in the disk tray 110 for the disk drive using a resonator 170 according to the present invention and the disk drive having the disk tray 110, the dominant resonance noise frequency band where the peak sound pressure level occurs can be effectively reduced or removed.

Also, by filling the resonance container 174' with a porous member 180, the high frequency noise band and the overall noise level can be reduced.

Although embodiments of the present invention have been shown and described it will be appreciated by those skilled in the art that changes may be made in these embodiments without departing from the principles and spirit of the invention, the scope of which is defined in the claims and their equivalents.

What is claimed is:

1. A disk tray for a disk drive that slides in and out of the disk drive, the disk tray comprising two or more resonators mounted on a lower surface of the disk tray to selectively reduce noise of at least two predetermined frequency bands that correspond to dominant noise frequency bands above 200 Hz, wherein each of the two or more resonators comprises:
a through hole penetrating the disk tray and operating as an entrance and a bottle neck of each resonator; and
a resonance container surrounding the through hole and having a predetermined volume, the predetermined frequency band being determined according to an area of a profile of the through hole, a length of the bottle neck of the through hole, and a volume of the resonance container,
wherein the each resonator further comprises an absorbing member filling the resonance container to selectively reduce noise of one of the at least two predetermined frequency bands, and
wherein the absorbing member is a porous material.

2. The disk tray according to claim 1, wherein a bottom surface of at least one of the resonance containers is open.

3. A disk drive comprising:
a disk tray that slides in and out of the disk drive and on which a disk is placed;

a disk driving portion rotating the disk at a predetermined speed;

a disk chucking apparatus holding the disk on the disk driving portion;

a data recording/reproducing unit recording data on the disk or reproducing data from the disk; and two or more resonators installed on a lower surface of the disk tray to selectively reduce noise of at least two predetermined frequency bands that correspond to dominant noise frequency bands above 200 Hz, wherein each of the two or more resonators comprises:

a through hole penetrating the disk tray and operating as an entrance and a bottle neck of each resonator; and a resonance container surrounding the through hole and having a predetermined volume, the predetermined frequency band being determined according to an area of a profile of the through hole, a length of the bottle neck of the through hole, and a volume of the resonance container, and wherein each resonator further comprises an absorbing member filling the resonance container to selectively reduce noise of one of the at least two predetermined frequency bands, and wherein the absorbing member is a porous material.

4. The disk tray according to claim 3, wherein a bottom surface of at least one of the resonance containers is open.

5. A resonator system having a plurality of resonators for a disk tray of a disk drive, each of the resonators comprising:

a through hole penetrating the disk tray and operating as an entrance and a bottle neck of the resonator; and a resonance container surrounding the through hole and having a predetermined volume, the resonator being mounted on the disk tray to selectively reduce noise of a predetermined frequency band, the predetermined frequency band being determined according to an area of a profile of the through hole, a length of the bottle neck of the through hole, and the volume of the resonance container;

wherein each of the resonators converts sound energy to thermal energy to reduce a sound pressure level of a resonance frequency to selectively absorb a specific frequency;

wherein at least two of the resonators respectively reduce noise of two different frequency bands that correspond to dominant noise frequency bands above 200 Hz, and wherein at least one of the resonators further comprises an absorbing member filling the resonance container to selectively reduce noise of a frequency band higher than the predetermined frequency band and the absorbing member is a sponge.

6. A resonator for a disk tray of a disk drive, comprising:

a through hole penetrating the disk tray and operating as an entrance and a bottle neck of the resonator; and a resonance container surrounding the through hole and having a predetermined volume, the resonator being mounted on the disk tray to selectively reduce noise of a predetermined frequency band, the predetermined frequency band being determined according to an area of a profile of the through hole, a length of the bottle neck of the through hole, and the volume of the resonance container;

wherein the resonator converts sound energy to thermal energy to reduce a sound pressure level of a resonance frequency to selectively absorb a specific frequency; and wherein the resonator further comprises an absorbing member filling the resonance container to selectively reduce noise of a frequency band larger than the predetermined frequency band, wherein the absorbing member is a porous member.

7. The resonator according to claim 6, wherein the porous member is a sponge.

8. A disk tray for a disk drive that slides in and out of the disk drive, the disk tray comprising two or more resonators mounted on a lower surface of the disk tray to selectively reduce at least two peak sound pressure levels that are above 200 Hz, wherein the peak sound pressure levels correspond to dominant noise frequency bands, wherein at least one resonator is a Helmholtz resonator comprising an absorbing member filling a resonance container surrounding a through hole and having a predetermined volume, wherein the absorbing member is a porous material, the resonator being mounted on the disk tray to selectively reduce noise of a predetermined frequency band, the predetermined frequency band being determined according to an area of a profile of the through hole, a length of the bottle neck of the through hole, and the volume of the resonance container, wherein air in the bottle neck begins to resonate to cause interference that causes frequency cancellation for a frequency larger than the predetermined frequency band.

* * * * *